2,954,367
Patented Sept. 27, 1960

2,954,367

PROCESS FOR THE POLYMERIZATION OF VINYL HYDROCARBONS WITH A TWO-COMPONENT CATALYST SYSTEM

Edwin J. Vandenberg, Wilmington, Del., assignor to Hercules Powder Company, Wilmington, Del., a corporation of Delaware No Drawing. Filed July 29, 1955, Ser. No. 525,363

20 Claims. (Cl. 260—88.1)

This invention relates to an improved process for polymerizing vinyl hydrocarbons alone or in admixture with other vinyl hydrocarbons whereby it is possible to carry out the polymerization at atmospheric or only slightly elevated pressures and at relatively low temperatures and obtain polymers and copolymers exhibiting unusual properties.

In Belgian Patents Nos. 533,362, 534,792 and 534,888 of K. Ziegler et al., there is described a new process of polymerizing ethylene to a high molecular weight polyethylene under relatively mild conditions of temperature and pressure by using as the catalyst for the polymerization a mixture of a compound of a metal of groups IV–B, V–B, VI–B or VIII of the periodic table, or manganese, in combination with an organometallic compound of an alkali metal, alkaline earth metal, zinc, earth metal (especially aluminum), or rare earth metal. The usual procedure for carrying out such a process is to mix the two catalyst components in a hydrocarbon solvent and then pass ethylene into the catalyst mixture at atmospheric or slightly elevated pressure and at room temperature or moderately elevated temperatures. It has been suggested that a reduction of the tetravalent titanium or other transition metal occurs on admixture with the organoaluminum compound to produce a mixture of lower valence compounds, but the mechanics of the reaction are not known. That a reaction has taken place is generally evidenced by the formation of a colored, usually brown to black, precipitate on admixture of the two reactants.

In my copending application Serial No. 500,041, filed April 7, 1955, there is described the use of a two-component catalyst system for the polymerization of olefins wherein there is used as one of the catalyst components the hydrocarbon-insoluble reaction product obtained in the above-mentioned Ziegler catalyst preparation but which had been separated from the hydrocarbon-soluble phase, and as the other catalyst component an organometallic compound of a metal from the group of alkali metals, alkaline earth metals, zinc, earth metals, and rare earth metals. By utilizing such a two-component catalyst system, it is possible to polymerize ethylenically unsaturated hydrocarbons under mild conditions of temperature and pressure more effectively than with the Ziegler catalyst alone and to realize many other advantages such as improved rate of polymerization and space-time yields, use of lower catalyst concentrations, etc.

Now, in accordance with this invention, it has been found that if a halogen-free organometallic compound is used as the second component, the whole reaction mixture produced in the above-mentioned Ziegler catalyst preparation may be used for the polymerization of vinyl hydrocarbons instead of separating and using only the hydrocarbon-insoluble reaction product. This is obviously an advantage insofar as saving of labor, time, etc., is concerned, but in addition has been found to give unexpected results in the polymerization of certain olefins, and particularly in the polymerization of propylene. In the latter case it has been found that by using the two-component catalyst composition of this invention, that is, the mixture of reaction products produced in the Ziegler catalyst preparation in combination with a halogen-free organometallic compound, it is possible to increase the ratio of the crystalline polypropylene to hydrocarbon-soluble polypropylene from about 1, as produced in my copending application, up to as high as about 19 depending on the choice of catalyst combination. In other words, the crystalline polypropylene may be obtained in yields as high as 95% of the total propylene polymer by using the proper choice of two-component catalyst system of this invention.

The mixture of reaction products used as one of the catalyst components in the process of this invention is readily prepared by simply mixing the defined metal compound of the designated groups of the periodic table with the organometallic compound of the selected metal. As already pointed out, the transition metal compound may be a compound of any metal of groups IV–B, V–B, VI–B or VIII of the periodic table, i.e., titanium, zirconium, hafnium, thorium, vanadium, columbium, tantalum, chromium, molybdenum, tungsten, uranium, iron, cobalt, nickel, etc., or manganese. The compound may be an inorganic salt such as a halide, oxyhalide, etc., or an organic salt or complex such as an acetylacetonate, etc. Exemplary of such compounds are titanium and zirconium tetrachloride, manganous chloride, nickelous chloride, ferrous chloride, ferric chloride, tetrabutyl titanate, zirconium acetylacetonate, vanadium oxy acetylacetonate, chromium acetylacetonate, etc. The organometallic compound that is reacted with one of the transition metal compounds or mixtures thereof may be any organo compound of an alkali metal, alkaline earth metal, zinc, earth metal, or rare earth metal, as for example, alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc.

The reaction between the transition metal compound and the organometallic compound to provide the reaction mixture component of my improved catalyst may be carried out by mixing the two compounds in any inert diluent, as for example, aliphatic hydrocarbons such as hexane, heptane, etc., cycloaliphatic hydrocarbons such as cyclohexane or aromatic hydrocarbons such as benzene, toluene, xylene, etc., halogenated aromatic hydrocarbons such as chlorobenzenes, chloronaphthalenes, etc., or any mixture of such inert diluents. Any concentration of the two reagents may be used that is convenient. Another method that may be used in preparing this catalyst component is to simply mix the two reagents, i.e., without the use of a diluent. The reaction of the two compounds may be carried out at any temperature and will generally be determined by the solvent, if used, the activity of the reactants, etc. For example, some metal alkyls would react at Dry Ice temperatures whereas others would require elevated temperatures. Usually the reaction is conveniently carried out at room temperature or slightly elevated temperatures, but a temperature of from about −50° C. to about 150° C. could be used.

In preparing the reaction mixture used as one component of my catalyst, the molar ratio of the two reactants may likewise be varied over a wide range. It is believed that a reduction of the transition metal compound from the higher valence state of the transition metal to one or more lower valence states takes place. Hence, there should be used an amount of the organometallic compound that will produce the desired amount of reduction. Thus, larger ratios of organometallic compound to the transition metal compound are required for alkali metal alkyls than for a trialkylaluminum and in the same way, more of an alkylaluminum dihalide than a dialkylaluminum monohalide. In general, the molar ratio of organometallic compound to transition metal compound will be from about 0.1:1 to about 100:1 and preferably will be from about 0.3:1 to about 10:1 and more preferably from about 0.5:1 to about 2:1. The selection of the molar ratio will, of course, depend on the monomer being polymerized, the transition metal compound, the organometallic compound, and the reaction conditions being used.

That a reaction takes place between the organometallic compound and the transition metal compound is readily apparent in those cases where both reagents are soluble in the hydrocarbon diluent inasmuch as an insoluble precipitate will form, as for example, in the case of the reaction of titanium tetrachloride with any of the aluminum alkyls, etc., or the reaction of such compounds as zirconium acetylacetonate with the halogen-containing aluminum alkyls. In some cases the transition metal compound used as the starting reactant may not be soluble to any appreciable degree, as for example, zirconium tetrachloride, in the inert diluent but usually the reduction by-products are then soluble. In some cases the reaction of the transition metal compound with the organometallic compound may form a completely soluble catalyst mixture, which mixture may also be used.

The mixture of reaction products in the hydrocarbon diluent may be used immediately or it may be aged prior to use. In some cases the activity of the reaction mixture is enhanced by allowing it to age for at least short periods of time before being used in the process of this invention. The aging may be carried out by allowing the reaction mixture to stand at room temperature or thereabouts for anywhere from a few hours to weeks or it may be greatly speeded up by carrying out the aging at elevated temperatures up to a temperature of about 100° C. or above. The reaction mixture may then be stored at low temperatures such as 0° C. or below, any further aging effects or other changes being substantially minimized thereby.

As has already been pointed out above, the process in accordance with this invention involves the use of a two-component catalyst system, one of which is the mixture of reaction products prepared as described above and the other of which is a halogen-free organometallic compound of a metal selected from the group of alkali metals, alkaline earth metals, zinc, earth metals, and rare earth metals. By the term "halogen-free organometallic compound" is, of course, meant an organometallic compound that does not contain halogen in the molecule. This second catalyst component may be the same organometallic compound that was used in preparing the reaction mixture component if, in such preparation a halogen-free organometallic compound was used, or a different organometallic compound may be used. Exemplary of the halogen-free organometallic compounds that may be used are the alkali metal alkyls or aryls such as butyllithium, amylsodium, phenylsodium, etc., dimethylmagnesium, diethylmagnesium, diethylzinc, trialkyl- or triaryl-aluminum compounds such as triethylaluminum, tripropylaluminum, triisobutylaluminum, trioctylaluminum, tridodecylaluminum, etc., alkyl- or arylaluminum hydrides such as diethylaluminum hydride, ethyl aluminum dihydride, diisobutylaluminum hydride, etc., and complexes of such organometallic compounds as, for example, sodium aluminum tetraethyl, lithium aluminum tetraoctyl, etc.

A very outstanding advantage in the use of the two-component catalyst combination used in this invention for the polymerization of vinyl hydrocarbons is that much lower catalyst concentrations may be used, and still obtain a practical rate, than when the transition metal compound and metal alkyl are merely mixed and used as such. As a result, the polymer so produced has a much lower inorganic content. The amount of each of the two catalyst components used in carrying out the polymerization in accordance with this invention will depend upon the monomer being polymerized, whether a batch or continuous process is used, whether they are mixed all at once, or in the batch process, one or both are added in increments, or in the continuous process, one or both are continuously added. In general, the amount of the reaction mixture catalyst component will be within the range of from a minor catalytic amount to a large excess, as for example, from about 0.1 to about 1000 millimoles per mole of monomer and in the batch process may be from about 0.1 millimole per liter of reaction mixture to about 100 millimoles per liter, and in some types of continuous operation even higher concentrations might be used. The amount of the halogen-free organometallic catalyst component added as the second catalyst component will depend not only on the above variations, but also on the activity of the organometallic compound being added. Usually the molar ratio of organometallic catalyst component to the reaction mixture catalyst component will be within the range of from about 0.05:1 to about 100:1, and preferably from about 0.2:1 to about 20:1.

It should be noted that while the second catalyst component is a halogen-free organometallic compound, the polymerization system is not necessarily halogen-free, since the organometallic compound reacted with the transition metal in forming the mixture of reaction products used as one catalyst component could contain halogen in the molecule. In fact, the halogen-free organometallic compound that is added as the second catalyst component could be a crude product containing some halogen-containing organometallic compounds, or a mixture of the halogen-free and halogen-containing compounds could be added provided that an adequate amount of the halogen-free organometallic compound is added, i.e., an amount within the above-specified ranges.

As has already been pointed out above, this two-component catalyst system may be used for the polymerization of any ethylenically unsaturated hydrocarbon containing a vinyl group, and particular linear 1-olefins, or the copolymerization of such unsaturated hydrocarbons. Thus, any hydrocarbon having the general formula $CH_2=CHR$ where R is hydrogen, alkyl, cycloalkyl, aryl, aralkyl, or alkaryl may be used. Exemplary of the vinyl hydrocarbons that may be homopolymerized or mixtures of which may be copolymerized are the linear 1-olefins such as ethylene, propylene, butene-1, hexene-1, heptene-1, octene-1, octadecene-1, dodecene-1, tert-butylethylene, 4- and 5-methylheptenes-1, etc., and substituted derivatives thereof such as styrene, allylbenzene, vinylcyclohexene, 4-vinylcyclohexene-1, hexadiene-1,4, etc. Particularly outstanding results are obtained in the polymerization of propylene with the two-component catalyst system of this invention. When propylene is polymerized with the Ziegler type of catalyst, there are two types of polymers formed, one being a somewhat lower viscosity polymer that is soluble in a hydrocarbon solvent and the other being a higher viscosity polymer which is crystalline and which is insoluble in hydrocarbon solvents. By using the combination of the reaction mixture component, prepared from monoethylaluminum dichloride and titanium tetrachloride, with a halogen-free organometallic compound in accordance with this invention, it is possible to obtain this crystalline high molecular weight polypropylene in an amount of as much as 95% of the polypropylene that is produced.

The polymerization of the vinyl hydrocarbons or the copolymerization of any mixture of two or more of such olefins may be carried out in a wide variety of ways. The process may be carried out as either a batch or continuous operation and with or without the use of an inert organic diluent as the reaction mixture. With the more volatile monomers, a diluent is usually preferred. Any inert liquid organic solvent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated aromatic hydrocarbons such as chlorobenzenes, chloronaphthalenes, etc.

The selection of the temperature and pressure used for the polymerization process will obviously depend upon the monomer, the activity of the catalyst system being used, the degree of polymerization desired, etc. In general, the polymerization will be carried out at room temperature or slightly above, but any temperature within the range of from about −50° C. to about 150° C. and preferably from about −20° C. to about 100° C. may be used. In the same way, while atmospheric pressure or a pressure of only a few pounds may be used, the polymerization may be carried out over a wide range of pressures, as for example, from a partial vacuum to about 1000 lb. and preferably from about atmospheric to about 500 lb. pressure. Higher pressures may, of course, be used, but generally do not appreciably alter the course of the polymerization.

The manner in which the two catalyst components are added to the polymerization system will depend upon the method by which the polymerization is carried out. They may be added all at once, in any order, or one or the other or both may be added in increments or continuously during the polymerization. Excellent results, and in some cases superior results, may be obtained by mixing the two catalyst components together, allowing the mixture to age for a short time and then adding the mixture all at one time, in increments, or continuously to the polymerization process. The two catalyst components that are combined for the polymerization will depend upon the monomer being polymerized, the degree of polymerization, etc. For the readily polymerized olefins such as ethylene, excellent results may be obtained with any combination of reaction mixture component with the halogen-free organometallic catalyst component. For less readily polymerized olefins, the most active combinations are preferred, as for example, the reaction mixture produced from titanium tetrachloride and a halogen-free organometallic compound when of low molar ratio, as for example, about 0.3:1 to about 2:1, or the reaction mixture produced from titanium tetrachloride and an alkylaluminum halide as the one catalyst component in combination with triisobutyl- or other trialkyl-aluminum or alkylaluminum hydrides such as diisobutyl-aluminum hydride as the second catalyst component.

The following examples will illustrate the homopolymerization and copolymerization of a wide variety of vinyl hydrocarbons in accordance with the process of this invention and some of the many variations that may be made in this process. The molecular weight of the polymers produced in these examples is shown by the Reduced Specific Viscosity (RSV) given for each. By the term "Reduced Specific Viscosity" is meant the $\eta sp./C$. determined on an 0.1% solution of the polymer in Decalin, containing 0.1 g. of the polymer per 100 ml. of solution, at 135° C. Where the melting point of the polymer is given, it is the temperature at which the birefringence due to crystallinity disappears. All parts and percentages are by weight unless otherwise indicated.

EXAMPLES 1–5

The air in a series of polymerization vessels was replaced with nitrogen and into each was then charged 33 parts of n-heptane and after evacuating, 2 parts of ethylene was added. After equalizing at 30° C., a solution of the organometallic catalyst component (triethylaluminum in Examples 1–3, a crude triisobutylaluminum containing about 60% of diisobutylaluminum hydride in Example 4, and a pure triisobutylaluminum in Example 5) in n-heptane was added followed by the mixture of reaction products obtained on mixing titanium tetrachloride and the specified aluminum alkyl in n-heptane. The mixture of reaction products used as the one catalyst component was in each case aged at room temperature for 35 days in Example 1 and for 2 hours in Examples 2–5. The initial pressure was about 50 p.s.i.g. The aluminum alkyl and amount of it, amount of titanium tetrachloride, and the molar ratio of the two used in preparing the reaction mixture catalyst component for each example are shown in Table I. Also set forth are the amount of aluminum alkyl added as the second catalyst component, the reaction time, and final pressure.

*Table 1*

| Ex. No. | Reaction Mixture Catalyst Components Formed From— | | | | | Organometallic Catalyst Component | | Reaction Time, Hours | Pressure, p.s.i.g. | Percent Conv. | RSV |
|---|---|---|---|---|---|---|---|---|---|---|---|
| | Al Alkyl | Parts | Transition Metal Compound | Parts | A:T Ratio[1] | Added | Parts | | | | |
| 1a | AlEt$_2$Cl | 0.015 | TiCl$_4$ | 0.05 | 0.5:1 | AlEt$_3$ | 0 | 19 | (2) | (2) | (2) |
| 1b | AlEt$_2$Cl | 0.015 | TiCl$_4$ | 0.05 | 0.5:1 | AlEt$_3$ | 0.11 | 0.7 | −2 | 83 | 19 |
| 1c | AlEt$_2$Cl | 0.03 | TiCl$_4$ | 0.05 | 1:1 | AlEt$_3$ | 0.11 | 0.7 | −1 | 86 | 20 |
| 2 | AlEtCl$_2$ | 0.12 | TiCl$_4$ | 0.05 | 4:1 | AlEt$_3$ | 0.11 | 0.5 | 0 | 76 | 48 |
| 3a | Al sesquichlorides | 0.09 | TiCl$_4$ | 0.05 | 3:1 | AlEt$_3$ | 0 | 1.2 | 0 | 81 | 17.3 |
| 3b | do | 0.09 | TiCl$_4$ | 0.05 | 3:1 | AlEt$_3$ | 0.11 | 0.25 | −2 | 83 | 20.5 |
| 4a | Crude Al(iBu)$_3$ | 0.02 | TiCl$_4$ | 0.05 | 0.5:1 | Crude Al(iBu)$_3$ | 0 | 0.25 | −6 | 92 | 2.1 |
| 4b | do | 0.02 | TiCl$_4$ | 0.05 | 0.5:1 | do | 0.08 | 0.25 | −10.5 | 100 | 14.4 |
| 4c | do | 0.04 | TiCl$_4$ | 0.05 | 1:1 | do | 0 | 0.75 | −2 | 87 | 14.9 |
| 4d | do | 0.04 | TiCl$_4$ | 0.05 | 1:1 | do | 0.08 | 0.25 | −6.5 | 92 | 15.9 |
| 4e | do | 0.08 | TiCl$_4$ | 0.05 | 2:1 | do | 0 | 0.25 | −7.5 | 93 | 25.6 |
| 4f | do | 0.08 | TiCl$_4$ | 0.05 | 2:1 | do | 0.08 | 0.25 | −10 | 94 | 18.1 |
| 5a | Pure Al(iBu)$_3$ | 0.1 | TiCl$_4$ | 0.05 | 2:1 | Pure Al(iBu)$_3$ | 0 | 0.5 | −2.5 | 92 | 22.6 |
| 5b | do | 0.1 | TiCl$_4$ | 0.05 | 2:1 | do | 0.1 | 0.25 | −8 | 99 | 21.5 |

[1] Molar ratio of alkyl aluminum to transition metal compound.
[2] No pressure drop.

When the polymerization was substantially complete as indicated by a drop in the gage pressure to 0 p.s.i., 4 parts of anhydrous ethanol was introduced to stop the polymerization. The polymer which had separated as an insoluble precipitate in each case was separated by filtration, washed twice with n-heptane, twice with absolute ethanol, refluxed for 15 minutes with 40 parts of a 10% methanolic solution of hydrogen chloride, filtered, and the polymer was washed with methanol until the filtrate was acid-free. The polymers so obtained were then dried for 4 hours at 80° C. in vacuo. The conversion of ethylene to polyethylene and Reduced Specific Viscosity are also tabulated in Table I. In Table I and the following tables the symbol "Et" is used for the ethyl radical and "iBu" for the isobutyl radical.

The data set forth in Table I clearly demonstrate the very greatly improved results that are obtained when the second catalyst component (a halogen-free aluminum alkyl in each case) is added to the mixture of reaction products over the use of the latter alone to catalyze the polymerization.

EXAMPLES 6–15

The procedure described for Examples 1–5 was utilized in these examples except that in Examples 6–12 other transition metal compounds were used in place of titanium tetrachloride and in Examples 13–15 organometallic compounds other than organo-aluminum compounds were used for the preparation of the mixture of reaction products used as one of the catalyst components. The aluminum alkyl, transition metal compound, amount of each, and the molar ratio of the two used in preparing the reaction mixture catalyst component for each example are set forth in Table II. The diluent used for the preparation of this catalyst component in Examples 6, 7 and 9 to 15 was n-heptane and toluene in Example 8. The reaction mixture catalyst component of Examples 6–8 was aged by heating for 16 hours at 90° C. under nitrogen and that of Examples 9–15 was aged at room temperature for 2 hours. The halogen-free organometallic compound added as the second catalyst component and the amount are also set forth in Table II along with the reaction time, final pressure, percent conversion, and Reduced Specific Viscosity of the polyethylene obtained in each case.

rotating rack in a constant temperature bath held at 30° C. When the vessel and contents were equalized at that temperature (an initial pressure of about 45 p.s.i.g.), the organometallic catalyst component was introduced and then the reaction mixture catalyst component was added. In Table III below are set forth, for each of these examples, the aluminum alkyl used to react with titanium tetrachloride in the preparation of the mixture of reaction products used as one component of the polymerization catalyst, after aging for 2 hours at room temperature, and the molar ratio of the two reactants used, the organometallic compound used as the second catalyst component and the parts of it added to each polymerization vessel. The reaction time shown in the table is taken from the time the reaction mixture catalyst component was added to the polymerization system.

At the end of the specified reaction time, the polymerization was stopped by the addition of 4 parts of anhydrous ethanol. Both heptane-soluble and heptane-insoluble polymers were produced. The insoluble polymer in each case was separated by filtration, washed twice with n-heptane, twice with absolute ethanol and then was refluxed for 15 minutes with 40 parts of 10% methanolic hydrogen chloride, after which it was washed acid-free with methanol and then dried for 4 hours at 80° C. in vacuo. The heptane-soluble polymer was isolated by combining the reaction mixture filtrate and heptane washings, concentrating by distillation, and then precipitating the polymer by adding a large excess of anhydrous ethanol. The polymer so obtained was washed with ethanol and then dried for 16 hours at 80° C. in vacuo.

The heptane-insoluble polypropylene produced in these examples is a crystalline material whereas the heptane-soluble polymer is rubbery. The amount of each produced and their characteristics are shown in the table. In general, the insoluble polymer produced in these examples had a melting point of around 160° C.

As may be seen from the data in Table III, greatly improved results are obtained when a halogen-free organometallic compound is added as a second catalyst component to the reaction mixture obtained on mixing an organometallic compound with titanium tetrachloride and used as one of the catalyst components. These data also

Table II

| Ex. No. | Reaction Mixture Catalyst Component Formed From— | | | | | Organometallic Catalyst Component | Parts | Reaction Time, Hours | Pressure, p.s.i.g. | Percent Conv. | RSV |
|---|---|---|---|---|---|---|---|---|---|---|---|
| | Al Alkyl | Parts | Transition Metal Compound | Parts | A:T Ratio [1] | | | | | | |
| 6a | AlEt$_2$Cl | 0.18 | ZrCl$_4$ | 0.06 | 6:1 | AlEt$_3$ | 0 | 5.0 | 25 | 23 | 5.9.[2] |
| 6b | AlEt$_2$Cl | 0.18 | ZrCl$_4$ | 0.06 | 6:1 | AlEt$_3$ | 0.11 | 3.0 | −1 | 85 | 47. |
| 7a | AlEt$_2$Cl | 0.18 | FeCl$_3$ | 0.04 | 6:1 | AlEt$_3$ | 0 | 24 | [3] | 0 | No polymer. |
| 7b | AlEt$_2$Cl | 0.18 | FeCl$_3$ | 0.04 | 6:1 | AlEt$_3$ | 0.11 | 24 | 42 | 10 | [4] |
| 8a | AlEt$_2$Cl | 0.18 | Cr acetyl acetonate | 0.085 | 6:1 | AlEt$_3$ | 0 | 24 | 47 | 3.3 | 22.0. |
| 8b | | | do | 0.085 | 6:1 | AlEt$_3$ | 0.11 | 24 | 45 | 3.8 | 37.7. |
| 9a | AlEt$_2$Cl | 0.18 | Th acetyl acetonate | 0.16 | 6:1 | AlEt$_3$ | 0 | 19 | (2) | Trace | |
| 9b | AlEt$_2$Cl | 0.18 | do | 0.16 | 6:1 | AlEt$_3$ | 0.11 | 19 | 3 | 75 | 60. |
| 10 | AlEt$_2$Cl | 0.18 | V oxy acetyl acetonate | 0.06 | 6:1 | Al(iBu)$_3$ | 0.1 | 19 | 6.5 | 70 | 29.3. |
| 11a | AlEt$_3$ | 0.06 | Ti(OCH$_3$)$_4$ | 0.03 | 2.7:1 | Al(iBu)$_3$ | 0 | 2.8 | 0 | 8.3 | Very low. |
| 11b | AlEt$_3$ | 0.06 | Ti(OCH$_3$)$_4$ | 0.03 | 2.7:1 | Al(iBu)$_3$ | 0.06 | 19 | 7.5 | 22 | 29.7. |
| 12 | AlEt$_3$ | 0.06 | Ti(OCH$_3$)$_4$ | 0.03 | 2.7:1 | Al(iBu)$_3$[a] | 0.1 | 19 | 0 | 34 | 37.6. |
| 13 | Al(iBu)$_3$ | 0.025 | TiCl$_4$ | 0.05 | 0.5:1 | Amyl Na | 0.1 | 0.25 | −11 | 100 | 24.8. |
| 14 | Al(iBu)$_3$ | 0.025 | TiCl$_4$ | 0.05 | 0.5:1 | Butyl Li | 0.03 | 0.25 | −9 | | 21.5. |
| 15 | Al(iBu)$_3$ | 0.025 | TiCl$_4$ | 0.05 | 0.5:1 | Et$_2$Mg | 0.08 | 0.25 | −11 | 91 | 14.7. |

[1] Molar ratio of organometallic compound to transition metal compound.
[2] This figure may be low since the solution contained gel.
[3] No pressure drop.
[4] Too high to measure at 0.1% conc. in Decalin.
[a] A crude triisobutylaluminum containing 61% diisobutylaluminum hydride.

EXAMPLES 16–19

The air in a series of polymerization vessels was replaced with nitrogen and into each was then charged 33 parts of n-heptane and, after evacuating, 8 parts of propylene was added, after which the vessel was placed on a demonstrate that unexpectedly high yields of the crystalline, insoluble polypropylene and low yields of the soluble polymer are obtained when monoethylaluminum dichloride is used in the preparation of the reaction mixture catalyst component and a trialkylaluminum added as the second catalyst component.

Table III

| Ex. No. | Reaction Mixture Catalyst Component Formed From— | | | | Organometallic Catalyst Component | | Reaction Time, Hours | Pressure, p.s.i.g. | Percent Conversion Heptane | | RSV Heptane | |
|---|---|---|---|---|---|---|---|---|---|---|---|---|
| | Al Alkyl | Parts | TiCl₄, Parts | A:T Ratio | Added | Parts | | | Insoluble | Soluble | Insoluble | Soluble |
| 16 | AlEtCl₂ | 0.12 | 0.05 | 4:1 | AlEt₃ | 0.11 | 48 | −1 | 79 | 4.4 | 24.4 | 0.9 |
| 17 | Al sesquichlorides | 0.09 | 0.05 | 3:1 | AlEt₃ | 0.11 | 48 | 6 | 50 | 22 | 19.8 | 1.8 |
| 18a | AlEt₂Cl | 0.015 | 0.05 | 0.5:1 | AlEt₃ | 0.11 | 19 | 7 | 33 | 26 | 5.3 | 1.9 |
| 18b | AlEt₂Cl | 0.03 | 0.05 | 1:1 | AlEt₃ | 0.11 | 19 | −2 | 52 | 32 | 5.4 | 2.1 |
| 18c | AlEt₂Cl | 0.06 | 0.05 | 2:1 | AlEt₃ | 0.11 | 1.5 | −0.5 | 46 | 34 | 4.5 | 1.4 |
| 18d | AlEt₂Cl | 0.18 | 0.05 | 6:1 | AlEt₃ | 0.11 | 1.5 | 0 | 48 | 31 | 4.7 | 1.4 |
| 19a | AlEt₃ | 0.03 | 0.05 | 1:1 | AlEt₃ | 0 | 19 | 30 | 14 | 12 | 11.7 | 1.2 |
| 19b | AlEt₃ | 0.03 | 0.05 | 1:1 | AlEt₃ | 0.11 | 19 | −5 | 56 | 34 | 6.3 | 1.9 |
| 19c | AlEt₃ | 0.06 | 0.05 | 2:1 | AlEt₃ | 0 | 19 | 33 | 9.6 | 12 | 7.9 | 0.8 |
| 19d | AlEt₃ | 0.06 | 0.05 | 2:1 | | 0.11 | 19 | 17 | 29 | 26 | 5.8 | 1.9 |

EXAMPLE 20

The procedure described in Examples 16 to 19 was utilized in this example for the polymerization of propylene except that titanium tetrabromide was used in place of titanium tetrachloride in the preparation of the reaction mixture catalyst component. The latter was formed by mixing 0.014 part of triethylaluminum and 0.092 part of titanium tetrabromide (a molar ratio of 0.5:1) in 1.4 parts of n-heptane. This reaction mixture was used as the one catalyst component and triethylaluminum, 0.11 part, was added as the second catalyst component. A duplicate polymerization was run without adding the second catalyst component. The results of these two runs are tabulated below:

| Second Catalyst Component | Reaction Time, Hours | Pressure, p.s.i.g. | Heptane-Insoluble | | Heptane-Soluble | |
|---|---|---|---|---|---|---|
| | | | Percent Conv. | RSV | Percent Conv. | RSV |
| Control (none added) | 19 | 36 | 1.6 | 1.7 | 8.6 | 0.3 |
| Added | 3.0 | 2 | 47 | 5.2 | 31 | 1.9 |

EXAMPLE 21

A polymerization vessel with a nitrogen atmosphere was charged with 1.4 parts of n-heptane and 10 parts of styrene. After evacuating and then equalizing at 30° C., there was added 0.20 part of pure triisobutylaluminum in 2.7 parts of n-heptane followed by the reaction mixture obtained by mixing 0.075 part of pure triisobutylaluminum with 0.095 part of titanium tetrachloride (0.75:1 molar ratio) in 2.7 parts of n-heptane and aging for 2 hours at room temperature. After 18.5 hours, 4 parts of anhydrous ethanol was added and the insoluble polymer that had formed was separated by filtration. The polymer was washed with toluene under nitrogen four times, then was refluxed for 15 minutes with 40 parts of a 10% methanolic solution of hydrogen chloride, separated by filtration, washed acid-free with methanol, and finally was dried in vacuo for 4 hours at 80° C. The toluene-insoluble polystyrene so obtained amounted to a conversion of 9.4% and had a reduced specific viscosity of 15.0 (determined on an 0.1% solution of the polymer in α-chloronaphthalene at 135° C.).

EXAMPLE 22

A polymerization vessel with a nitrogen atmosphere was charged with 33 parts of n-heptane and 10 parts of octene-1. After equalizing the vessel and contents at 30° C., there was added 0.2 part of pure triisobutylaluminum followed by the reaction mixture obtained by mixing 0.025 part of pure triisobutylaluminum with 0.05 part of titanium tetrachloride (0.5:1 molar ratio) in 1.4 parts of n-heptane and aging for 2 hours at room temperature. At the end of 19 hours the polymerization was stopped by the addition of 4 parts of anhydrous ethanol. The heptane solution of polymer so obtained was washed twice with 10% methanolic hydrogen chloride and then with methanol until acid-free. The polymer was precipitated from the heptane solution by adding excess anhydrous ethanol and then was separated by filtration. The polyocetene so obtained amounted to a conversion of 73% and was a tacky, film-forming, rubbery polymer with a reduced specific viscosity of 2.9 and a brittle point between about −50° C. and about −60° C.

EXAMPLE 23

A polymerization vessel with a nitrogen atmosphere was charged with 33 parts of n-heptane, then evacuated and 2.2 parts of propylene and 1.5 parts of ethylene were added. After equalizing at 30° C., 0.03 part of triethylaluminum was added followed by the reaction mixture obtained by mixing 0.03 part of diethylaluminum chloride with 0.024 part of titanium tetrachloride in 1.4 parts of n-heptane and aging for 2 hours at room temperature. After 4 minutes the polymerization was stopped by adding 4 parts of anhydrous ethanol. The heptane-insoluble polymer that had formed was separated by filtration, refluxed with 40 parts of 10% methanolic hydrogen chloride for 15 minutes, washed acid-free with methanol, and dried in vacuo. The propylene-ethylene copolymer so obtained amounted to an 11% conversion based on the total monomers charged, had a melting point of 126° C., a reduced specific viscosity of 13.4 and, based on the methyl content determined by infrared analysis, contained 15% propylene.

EXAMPLE 24

Example 16 was repeated except that 10.6 parts of butene-1 was substituted for the propylene used in that example and the reaction time was 23.5 hours. Both a heptane-soluble and heptane-insoluble polymer were produced and separated as in that example. The heptane-soluble polymer was a rubbery type of polymer and was obtained in an amount equal to a conversion of 2.6% and it had a reduced specific viscosity of 1.4. The heptane-insoluble polymer was a crystalline polymer with a reduced specific viscosity of 11.9 and was obtained in an amount equal to a conversion of 40%.

The periodic chart used in this specification and appended claims for designating the groups and subgroups of the periodic table is that given in the "Handbook of Chemistry and Physics," published by Chemical Rubber Publishing Company, Cleveland, Ohio, on pages 392–393 of the 36th edition.

What I claim and desire to protect by Letters Patent is:

1. The process of preparing a poly(olefin hydrocarbon) which comprises polymerizing at least one ethylenically unsaturated olefin hydrocarbon containing a vinyl group at a temperature of from about −50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a compound selected from the group consisting of the halides, acetylacetonates and alkoxides of a metal selected from the group consisting of metals of groups IV–B, V–B, VI–B and VIII of the periodic table with an alkyl compound of a metal selected from the group consisting of the alkali metals, magnesium and aluminum in a molar ratio of from about 1:0.1 to about 1:100 and (2) a halogen-free alkyl compound of a metal selected from the group consisting of alkali metals, magnesium and aluminum in an amount such that the molar ratio of the second catalyst component to the first catalyst component will be from about 0.05:1 to 100:1.

2. The process of preparing a poly(olefin hydrocarbon) which comprises polymerizing at least one 1-olefin at a temperature of from about −50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a compound selected from the group consisting of the halides, acetylacetonates and alkoxides of a metal selected from the group consisting of metals of groups IV–B, V–B, VI–B and VIII of the periodic table with an alkyl compound of a metal selected from the group consisting of the alkali metals, magnesium and aluminum in a molar ratio of from about 1:0.1 to about 1:100 and (2) a halogen-free alkyl compound of a metal selected from the group consisting of alkali metals, magnesium and aluminum in an amount such that the molar ratio of the second catalyst component to the first catalyst component will be from about 0.05:1 to 100:1.

3. The process of preparing a poly(olefin hydrocarbon) which comprises polymerizing at least one linear 1-olefin at a temperature of from about −50° C. to about 150° C. in an inert liquid organic diluent by contacting said unsaturated hydrocarbon with at least a catalyst amount of a two-component catalyst composition comprising (1) the reaction mixture produced prior to use in the polymerization process by the reaction in an inert liquid hydrocarbon diluent of a compound selected from the group consisting of the halides, acetylacetonates and alkoxides of a metal selected from the group consisting of metals of groups IV–B, V–B, VI–B and VIII of the periodic table with an alkyl compound of a metal selected from the group consisting of the alkali metals, magnesium and aluminum in a molar ratio of from about 1:0.1 to about 1:100 and (2) a halogen-free alkyl compound of a metal selected from the group consisting of alkali metals, magnesium and aluminum in an amount such that the molar ratio of the second catalyst component to the first catalyst component will be from about 0.05:1 to 100:1.

4. The process of preparing a poly(olefin hydrocarbon) which comprises polymerizing at least one monoethylenically unsaturated aromatic hydrocarbon containing a vinyl group at a temperature of from about −50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a compound selected from the group consisting of the halides, acetylacetonates and alkoxides of a metal selected from the group consisting of metals of groups IV–B, V–B VI–B and VIII of the periodic table with an alkyl compound of a metal selected from the group consisting of the alkali metals, magnesium and aluminum in a molar ratio of from about 1:0.1 to about 1:100 and (2) a halogen-free alkyl compound of a metal selected from the group consisting of alkali metals, magnesium and aluminum in an amount such that the molar ratio of the second catalyst component to the first catalyst component will be from about 0.05:1 to 100:1.

5. The process of preparing a poly(olefin hydrocarbon) which comprises copolymerizing at least two 1-olefins at a temperature of from about −50° C. to about 150° C. in an inert liquid organic diluent by contacting said unsaturated hydrocarbons with at least a catalytic amount of a two-component catalyst composition comprising (1) the reaction mixture produced prior to use in the polymerization process by the reaction in an inert liquid hydrocarbon diluent of a compound selected from the group consisting of the halides, acetylacetonates and alkoxides of a metal selected from the group consisting of metals of groups IV–B, V–B, VI–B and VII of the periodic table with an alkyl compound of a metal selected from the group consisting of the alkali metals, magnesium and aluminum in a molar ratio of from about 1:0.1 to about 1:00 and (2) a halogen-free alkyl compound of a metal selected from the group consisting of alkali metals, magnesium and aluminum in an amount such that the molar ratio of the second catalyst component to the first catalyst component will be from about 0.05:1 to 100:1.

6. The process of preparing a poly(olefin hydrocarbon) which comprises polymerizing at least one monoethylenically unsaturated hydrocarbon containing a vinyl group at a temperature of from about −50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium halide with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

7. The process of preparing a poly(olefin hydrocarbon) which comprises polymerizing at least one linear 1-olefin at a temperature of from about −50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium halide with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

8. The process of preparing a poly(olefin hydrocarbon) which comprises copolymerizing at least two 1-olefins at a temperature of from about −50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium halide with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

9. The process of preparing polyethylene which comprises polymerizing ethylene at a temperature of from about −50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium halide with an alkylaluminum compound in a molar ratio of from about 1:01 to about 1:100 and (2) a halogen-free alkylaluminum compound in an amount such that the molar ratio of the second catalyst component to the first catalyst component will be from about 0.05:1 to 100:1.

10. The process of preparing polypropylene which comprises polymerizing propylene at a temperature of from about —50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium halide with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

11. The process of preparing polystyrene which comprises polymerizing styrene at a temperature of from about —50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium halide with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

12. The process of preparing a poly(olefin hydrocarbon) which comprises polymerizing a linear 1-olefin at a temperature of from about —50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium tetrachloride with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

13. The process of preparing polyethylene which comprises polymerizing ethylene at a temperature of from about —50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium tetrachloride with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

14. The process of preparing polypropylene which comprises polymerizing propylene at a temperature of from about —50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium tetrachloride with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

15. The process of preparing a poly(olefin hydrocarbon) which comprises copolymerizing ethylene and propylene at a temperature of from about —50° C. to about 150° C. in an inert liquid organic diluent by contacting a mixture of ethylene and propylene with at least a catalytic amount of a two-component catalyst composition comprising (1) the reaction mixture produced prior to use in the polymerization process by the reaction in an inert liquid hydrocarbon diluent of a titanium tetrachloride with an alkylaluminum compound in a molar ratio of from about 1:0.1 to about 1:100 and (2) a halogen-free alkylaluminum compound in an amount such that the molar ratio of the second catalyst component to the first catalyst component will be from about 0.05:1 to 100:1.

16. The process of preparing polystyrene which comprises polymerizing styrene at a temperature of from about —50° C. to about 150° C. in an inert liquid organic diluent by contacting said unsaturated hydrocarbon with at least a catalytic amount of a two-component catalyst composition comprising (1) the reaction mixture produced prior to use in the polymerization process by the reaction in an inert liquid hydrocarbon diluent of a titanium tetrachloride with a trialkylaluminum in a molar ratio of from about 1:0.1 to about 1:100 and (2) a trialkylaluminum in an amount such that the molar ratio of the second catalyst component to the first catalyst component will be from about 0.05:1 to 100:1.

17. The process of preparing polyethylene which comprises polymerizing ethylene at a temperature of from about —50° C. to about 150° C. in an inert liquid hydrocarbon diluent by contacting ethylene with at least a catalytic amount of a two-component catalyst composition comprising (1) the reaction mixture produced prior to use in the polymerization process by the reaction in an inert liquid hydrocarbon diluent of titanium tetrachloride with ethylaluminum sesquichloride in a molar ratio of from about 1:0.1 to about 1:100 and (2) a trialkylaluminum in an amount such that the molar ratio of the second catalyst component to the first catalyst component will be from about 0.05:1 to 100:1.

18. The process of preparing polypropylene which comprises polymerizing propylene at a temperature of from about —50° C. to about 150° C. in an inert liquid hydrocarbon diluent by contacting propylene with at least a catalytic amount of a two-component catalyst composition comprising (1) the reaction mixture produced prior to use in the polymerization process by the reaction in an inert liquid hydrocarbon diluent of titanium tetrachloride with monoethylaluminum dichloride in a molar ratio of from about 1:0.1 to about 1:100 and (2) a trialkylaluminum in an amount such that the molar ratio of the second catalyst component to the first catalyst component will be from about 0.05:1 to 100:1.

19. The process of preparing polybutene which comprises polymerizing butene-1 at a temperature of from about —50° C. to about 150° C. in an inert liquid hydrocarbon diluent by contacting butene-1 with at least a catalytic amount of a two-component catalyst composition comprising (1) the reaction mixture produced prior to use in the polymerization process by the reaction in an inert liquid hydrocarbon diluent of titanium tetrachloride with monoethylaluminum dichloride in a molar ratio of from about 1:0.1 to about 1:100 and (2) a trialkylaluminum in an amount such that the molar ratio of the second catalyst component to the first catalyst component will be from about 0.05:1 to 100:1.

20. The process of preparing a poly(olefin hydrocarbon) which comprises copolymerizing ethylene and propylene at a temperature of from about —50° C. to about 150° C. in an inert liquid organic diluent by contacting a mixture of ethylene and propylene with at least a catalytic amount of a two-component catalyst composition comprising (1) the reaction mixture produced prior to use in the polymerization process by the reaction in an inert liquid hydrocarbon diluent of titanium tetrachloride with diethylaluminum chloride in a molar ratio of from about 1:0.1 to about 1:100 and (2) a trialkylaluminum in an amount such that the molar ratio of the second catalyst component to the first catalyst component will be from about 0.05:1 to 100:1.

References Cited in the file of this patent

UNITED STATES PATENTS

| | | |
|---|---|---|
| 2,721,189 | Anderson | Oct. 18, 1955 |
| 2,839,518 | Brebner | June 17, 1958 |

FOREIGN PATENTS

| | | |
|---|---|---|
| 526,101 | Italy | May 14, 1955 |
| 533,362 | Belgium | May 16, 1955 |